United States Patent
Chen et al.

(10) Patent No.: US 11,105,924 B2
(45) Date of Patent: Aug. 31, 2021

(54) OBJECT LOCALIZATION USING MACHINE LEARNING

(71) Applicant: Waymo LLC, Mountain View, CA (US)

(72) Inventors: Yu-Han Chen, Sunnyvale, CA (US); Wan-Yen Lo, Sunnyvale, CA (US); Alper Ayvaci, Santa Clara, CA (US); Abhijit Ogale, Sunnyvale, CA (US); Hyman Murveit, Portola Valley, CA (US)

(73) Assignee: Waymo LLC, Mountain View, CA (US)

( * ) Notice: Subject to any disclaimer, the term of this patent is extended or adjusted under 35 U.S.C. 154(b) by 350 days.

(21) Appl. No.: 16/151,880

(22) Filed: Oct. 4, 2018

(65) Prior Publication Data

US 2020/0110175 A1   Apr. 9, 2020

(51) Int. Cl.
*G01S 17/04* (2020.01)
*G06N 20/00* (2019.01)
(Continued)

(52) U.S. Cl.
CPC .............. *G01S 17/04* (2020.01); *G01S 17/89* (2013.01); *G06K 9/00805* (2013.01); *G06N 3/08* (2013.01);
(Continued)

(58) Field of Classification Search
CPC .............. G06K 9/6273; G06K 9/6288; G06K 9/00805; G06K 9/4628; G01S 17/04;
(Continued)

(56) References Cited

U.S. PATENT DOCUMENTS

| 8,861,842 | B2 | 10/2014 | Jung et al. |
| 2017/0206426 | A1* | 7/2017 | Schrier ............... G06K 9/6273 |

(Continued)

FOREIGN PATENT DOCUMENTS

| WO | WO 2018/052714 | 3/2018 | |
| WO | WO-2018052714 A2 * | 3/2018 | ........... G06K 9/4628 |

OTHER PUBLICATIONS

Szarvas "Real-time Pedestrian Detection Using Lidar and Convolutional Neural Networks" (Year: 2015).*

(Continued)

*Primary Examiner* — Regis J Betsch
*Assistant Examiner* — Kaleria Knox
(74) *Attorney, Agent, or Firm* — Fish & Richardson P.C.

(57) ABSTRACT

Methods, systems, and apparatus, including computer programs encoded on a computer storage medium, for determining a location of a particular object relative to a vehicle. In one aspect, a method includes obtaining sensor data captured by one or more sensors of a vehicle. The sensor data is processed by a convolutional neural network to generate a sensor feature representation of the sensor data. Data is obtained which defines a particular spatial region in the sensor data that has been classified as including sensor data that characterizes the particular object. An object feature representation of the particular object is generated from a portion of the sensor feature representation corresponding to the particular spatial region. The object feature representation of the particular object is processed using a localization neural network to generate the location of the particular object relative to the vehicle.

19 Claims, 5 Drawing Sheets (51) Int. Cl.
    *G01S 17/89* (2020.01)
    *G06K 9/00* (2006.01)
    *G06N 3/08* (2006.01)
    *G06N 7/00* (2006.01)
(52) U.S. Cl.
    CPC .............. *G06N 7/005* (2013.01); *G06N 20/00* (2019.01); *G06T 2207/20132* (2013.01); *G06T 2207/30261* (2013.01)
(58) Field of Classification Search
    CPC .......... G01S 17/89; G06N 20/00; G06N 3/08; G06N 7/005; G06T 2207/20132; G06T 2207/30261; G06T 7/248; G05D 1/0088
    See application file for complete search history.

(56) References Cited

U.S. PATENT DOCUMENTS

| | | |
|---|---|---|
| 2018/0150976 A1 | 5/2018 | Loy et al. |
| 2018/0173971 A1* | 6/2018 | Jia ..................... G06K 9/6288 |
| 2018/0211403 A1 | 7/2018 | Hotson et al. |
| 2018/0232585 A1* | 8/2018 | Kim ..................... G05D 1/0088 |
| 2019/0026905 A1* | 1/2019 | Siegemund ............. G06T 7/248 |

OTHER PUBLICATIONS

Girshick et al. "Fast R-CNN," arXiv 1504.08083v2, Sep. 27, 2015, 9 pages.

Leitner et al. "Learning Spatial Object Localization from Vision on a Humanoid Robot," International Journal of Advanced Robotic Systems vol. 9, Dec. 2012, 10 pages.

Zhao et al. "A novel three-dimensional object detection with modified You Only Look Once method," International Journal of Advanced Robotic Systems, Mar.-Apr. 2018, 13 pages.

PCT International Search Report and Written Opinion in International Appln. No. PCT/US0219/051387, dated Nov. 21, 2019, 13 pages.

\* cited by examiner

OBJECT LOCALIZATION USING MACHINE LEARNING

BACKGROUND

This specification relates to autonomous vehicles.

Autonomous vehicles include self-driving cars, boats, and aircraft. Autonomous vehicles use a variety of on-board sensors and computer systems to detect nearby objects and use such detections to make control and navigation decisions.

SUMMARY

This specification describes a system implemented as computer programs on one or more computers in one or more locations that performs object localization.

According to a first aspect there is provided a method which includes obtaining sensor data captured by one or more sensors of a vehicle. The sensor data is processed using a convolutional neural network to generate a sensor feature representation of the sensor data. Data is obtained which defines a particular spatial region in the sensor data that has been classified as including sensor data that characterizes a particular object in an environment in a vicinity of the vehicle. An object feature representation of the particular object is generated from a portion of the sensor feature representation corresponding to the particular spatial region. The object feature representation of the particular object is processed using a localization neural network to generate an output characterizing a location of the particular object in the environment relative to the vehicle.

In some implementations, sensor data captured by one or more of: a laser sensor of the vehicle, a radar sensor of the vehicle, and a camera sensor of the vehicle, is aligned and combined.

In some implementations, the particular spatial region in the sensor data that has been classified as including sensor data that characterizes a particular object in the environment in the vicinity of the vehicle is defined by a bounding box with a rectangular geometry.

In some implementations, the particular spatial region in the sensor data that has been classified as including sensor data that characterizes a particular object in an environment in a vicinity of the vehicle is generated by processing at least part of the sensor data using an object detection neural network.

In some implementations, the object feature representation of the particular object is generated from a portion of the sensor data corresponding to the particular spatial region in addition to the portion of the sensor feature representation corresponding to the particular spatial region.

In some implementations, to generate the object feature representation of the particular object, the portion of the sensor feature representation corresponding to the particular spatial region is cropped and transformed using one or more pooling operations.

In some implementations, the localization neural network is configured to generate coordinates characterizing a position of a center of the particular object in the environment. The coordinates may be expressed in a coordinate system which is defined relative to the vehicle.

In some implementations, the localization neural network is configured to generate a distance value characterizing a distance of the particular object in the environment from the vehicle.

According to a second aspect there is provided a system, including a data processing apparatus and a memory in data communication with the data processing apparatus and storing instructions that cause the data processing apparatus to perform the operations of the previously described method.

According to a third aspect there is provided one or more non-transitory computer storage media storing instructions that when executed by one or more computers cause the one or more computers to perform the operations of the previously described method.

Particular embodiments of the subject matter described in this specification can be implemented so as to realize one or more of the following advantages.

The object localization system described in this specification can accurately determine the location of an object relative to a vehicle based on spatial data maps representing sensor data captured by the sensors of the vehicle. Therefore, the object localization system can be deployed in a vehicle on-board system to enable the on-board system to make fully-autonomous or partly-autonomous driving decisions, present information to the driver of the vehicle to assist the driver in operating the vehicle safely, or both.

The object localization system described in this specification can be trained to directly predict the locations of objects relative to the vehicle from spatial data maps representing sensor data captured by the sensors of the vehicle. In particular, the object localization system described in this specification can learn to implicitly recognize object-specific features (e.g., size and shape) and contextual features (e.g., position relative to the road) of objects from spatial data maps without being explicitly programmed to do so. In contrast, some conventional systems perform object localization by processing large numbers of hand-crafted features (e.g., the possible heights of traffic lights, the shapes of traffic cones, and the like) which must be explicitly specified as inputs to the conventional system. The object localization system described in this specification may achieve higher localization accuracy than these conventional systems and does not necessitate laborious hand-crafted feature engineering.

The object localization system described in this specification can be co-trained to generate auxiliary outputs in addition to object localization outputs (e.g., auxiliary outputs which characterize the geometry of the environment in the vicinity of the vehicle). Co-training the object localization system to generate auxiliary outputs can (in some cases) enable the object localization system described in this specification to reach an acceptable performance level (e.g., object localization accuracy) over fewer training iterations than some conventional object localization systems. Therefore, training the object localization system described in this specification may consume fewer computational resources (e.g., memory, computing power, or both) than training some conventional object localization systems.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a vehicle can use an object localization system to determine the locations, relative to the vehicle, of objects in the environment in the vicinity of the vehicle. To determine the location of a particular object relative to the vehicle, the object localization system processes (e.g., using a convolutional neural network) spatial data maps representing sensor data captured by sensors of the vehicle to generate a feature representation of the sensor data. The object localization system generates a feature representation of the particular object from a portion of the feature representation of the sensor data that characterizes the particular object. Subsequently, the object localization system processes the feature representation of the particular object using a localization neural network to determine the location of the particular object relative to the vehicle. The feature representation of the particular object implicitly characterizes various properties of the particular object which may be useful for determining the location of the particular object relative to the vehicle. For example, the feature representation of the particular object may characterize the size and shape of the particular object, and laser and radar sensor measurements corresponding to the particular object. As another example, the feature representation of the particular object may characterize the position of the particular object relative to the road and the relationships between the particular object and other nearby objects.

The vehicle can use the output of the object localization system to perform actions which cause the vehicle to operate more safely. For example, in response to determining that the location of an object (e.g., a pedestrian) is in the future trajectory of the vehicle, a planning system of the vehicle can automatically apply the brakes of the vehicle or otherwise automatically change the future trajectory of the vehicle to prevent a collision between the object and the vehicle. As another example, in response to determining that the location of an object is in the future trajectory of the vehicle, a user interface system can present an alert message to the driver of the vehicle with instructions to adjust the future trajectory of the vehicle or apply vehicle brakes prior to collision.

These features and other features are described in more detail below.

Figure 1:
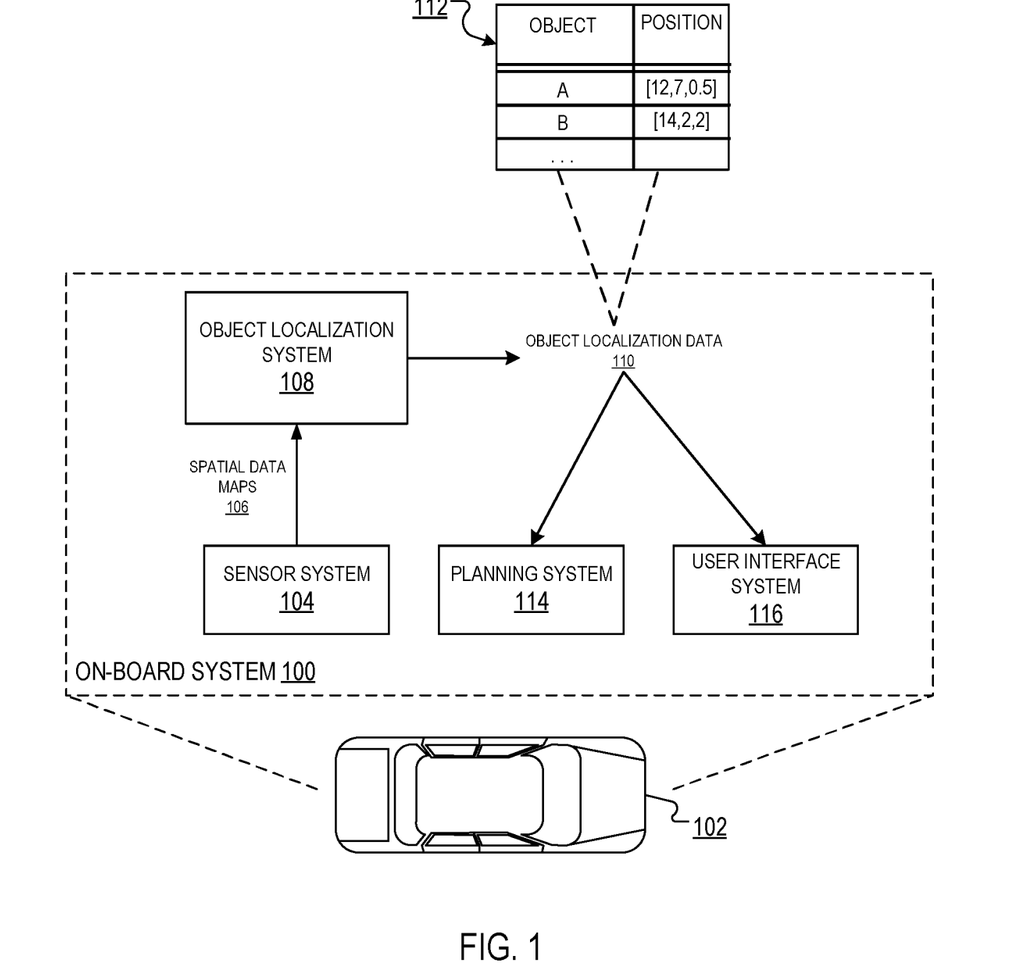
FIG. 1 is a block diagram of an example on-board system.

FIG. 1 is a block diagram of an example on-board system 100. The on-board system 100 is composed of hardware and software components, some or all of which are physically located on-board a vehicle 102. In some cases, the on-board system 100 can make fully-autonomous or partly-autonomous driving decisions (i.e., driving decisions taken independently of the driver of the vehicle 102), present information to the driver of the vehicle 102 to assist the driver in operating the vehicle safely, or both. For example, in response to determining that the vehicle 102 is likely to collide with an object, the on-board system 100 may autonomously apply the brakes of the vehicle 102 or otherwise autonomously change the trajectory of the vehicle 102 to prevent a collision between the vehicle 102 and the object.

As another example, in response to determining that the vehicle 102 is likely to collide with an object, the on-board system 100 may present an alert message to the driver of the vehicle 102 with instructions to adjust the trajectory of the vehicle 102 to avoid a collision.

Although the vehicle 102 in FIG. 1 is depicted as an automobile, and the examples in this document are described with reference to automobiles, in general the vehicle 102 can be any kind of vehicle. For example, besides an automobile, the vehicle 102 can be a watercraft or an aircraft. Moreover, the on-board system 100 can include components additional to those depicted in FIG. 1 (e.g., a collision detection system or a navigation system).

The on-board system 100 includes a sensor system 104 which enables the on-board system 100 to "see" the environment in the vicinity of the vehicle 102. More specifically, the sensor system 104 includes one or more sensors, some of which are configured to receive reflections of electromagnetic radiation from the environment in the vicinity of the vehicle 102. For example, the sensor system 104 can include one or more laser sensors (e.g., LIDAR laser sensors) that are configured to detect reflections of laser light. As another example, the sensor system 104 can include one or more radar sensors that are configured to detect reflections of radio waves. As another example, the sensor system 104 can include one or more camera sensors that are configured to detect reflections of visible light.

In some implementations, the sensor system 104 includes a combination of short-range and long-range laser sensors. The short-range laser sensors can be used to detect the ground surrounding vehicle 102 and objects near the vehicle 102 (e.g., objects within 40 meters of the vehicle 102). The long-range laser sensors can be used to detect objects which are farther away from the vehicle 102 (e.g., objects up to 80 meters away from the vehicle 102).

The sensor system 104 continuously (i.e., at each of multiple time points) captures raw sensor data which can indicate the directions, intensities, and distances traveled by reflected radiation. For example, a sensor in the sensor system 104 can transmit one or more pulses of electromagnetic radiation in a particular direction and can measure the intensity of any reflections as well as the time that the reflection was received. A distance can be computed by determining the time which elapses between transmitting a pulse and receiving its reflection. Each sensor can continually sweep a particular space in angle, azimuth, or both. Sweeping in azimuth, for example, can allow a sensor to detect multiple objects along the same line of sight.

The sensor system 104 is configured to process the raw sensor data captured at a time point to generate one or more spatial data maps 106 that represent the raw sensor data captured at the time point. Each spatial data map 106 can be represented as a matrix (e.g., a two-, three-, or four-dimensional matrix) of numerical values. For example, the sensor system 104 may generate spatial data maps 106 representing the raw sensor data captured by the laser sensors, the radar sensors, or both, which characterize the distance from the vehicle 102 to each of multiple points in the vicinity of the vehicle. As another example, the sensor system 104 may generate spatial data maps 106 representing the raw sensor data captured by the camera sensors which characterize the visual appearance of the environment in the vicinity of the vehicle by one or more photographic images (e.g., red-green-blue (RGB) images).

The on-board system 100 includes an object localization system 108 which is configured to process the spatial data maps 106 to generate object localization data 110 characterizing the locations, relative to the vehicle 102, of different objects in the vicinity of the vehicle 102. For example, as will be described in more detail with reference to FIG. 2, the object localization data 110 may characterize the location of an object in the vicinity of the vehicle 102 by a set of numerical coordinates indicating the location of the object in a coordinate system. The example object localization data 112 depicted in FIG. 1 characterizes the location of object A by the Cartesian coordinates [12, 7, 0.5] and the location of object B by the Cartesian coordinates [14, 2, 2]. As another example, the object localization data 110 may characterize the location of an object in the vicinity of the vehicle 102 by a numerical value indicating the distance (e.g., measured in feet) of the object from the vehicle 102. Objects in the vicinity of the vehicle 102 may include, for example, pedestrians, bicyclists, animals, other vehicles, road signs, pylons, and traffic lights.

The on-board system 100 can provide the object localization data 110 generated by the object localization system 100 to a planning system 114, a user interface system 116, or both.

When the planning system 114 receives the object localization data 110, the planning system 114 can use the object localization data 110 to make fully-autonomous or partly-autonomous planning decisions which plan the future trajectory of the vehicle. The planning decisions generated by the planning system can, for example, include: yielding (e.g., to other vehicles), stopping (e.g., at a Stop sign), passing other vehicles, adjusting vehicle lane position to accommodate a bicyclist, slowing down in a school or construction zone, merging (e.g., onto a highway), and parking. For example, the planning system 114 can autonomously generate planning decisions to navigate the vehicle 102 to avoid a collision with an object by changing the future trajectory of the vehicle 102 to avoid the object. In a particular example, the planning system 114 can generate planning decisions to apply the brakes of the vehicle 102 to avoid a collision with a pedestrian in the current trajectory of the vehicle 102. As another example, in response to receiving object localization data 110 indicating that a "Stop" sign is adjacent to the future trajectory of the vehicle 102, the planning system can generate planning decisions to apply the brakes of the vehicle 102 before the Stop sign.

The planning decisions generated by the planning system 114 can be provided to a control system of the vehicle. The control system of the vehicle can control some or all of the operations of the vehicle by implementing the planning decisions generated by the planning system. For example, in response to receiving a planning decision to apply the brakes of the vehicle, the control system of the vehicle may transmit an electronic signal to a braking control unit of the vehicle. In response to receiving the electronic signal, the braking control unit can mechanically apply the brakes of the vehicle.

When the user interface system 116 receives the object localization data 110, the user interface system 116 can use the object localization data 110 to present information to the driver of the vehicle 102 to assist the driver in operating the vehicle 102 safely. The user interface system 116 can present information to the driver of the vehicle 102 by any appropriate means, for example, by an audio message transmitted through a speaker system of the vehicle 102 or by alerts displayed on a visual display system in the vehicle (e.g., an LCD display on the dashboard of the vehicle 102). In a particular example, the user interface system 116 can present an alert message to the driver of the vehicle 102 with instructions to adjust the trajectory of the vehicle 102 to avoid a collision with a pedestrian in the current trajectory of the vehicle 102.

Figure 2:
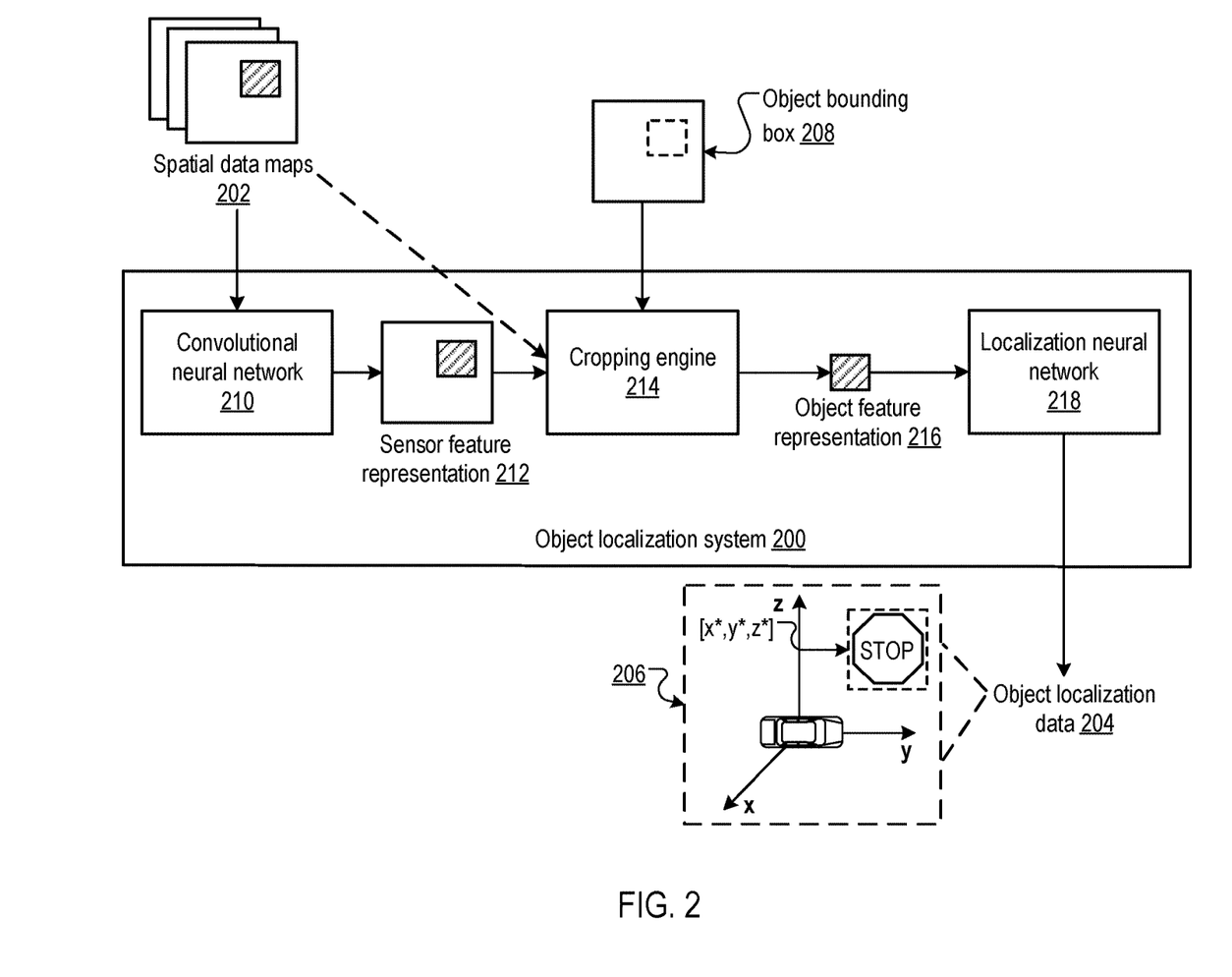
FIG. 2 is a block diagram of an example object localization system.

FIG. 2 is a block diagram of an example object localization system 200. The object localization system 200 is an example of a system implemented as computer programs on one or more computers in one or more locations in which the systems, components, and techniques described below are implemented.

The object localization system 200 is configured to process spatial data maps 202 representing sensor data captured by sensors on a vehicle to generate object localization data 204 characterizing the locations, relative to the vehicle, of one or more objects in the vicinity of the vehicle. As described with reference to FIG. 1, each spatial data map 202 can represent raw sensor data captured by laser sensors, radar sensors, camera sensors, or other vehicle sensors, and may be represented as a matrix (e.g., a two- or three-dimensional matrix) of numerical values. In some cases, each spatial data map can be represented as a matrix where two of the dimensions of the matrix are "spatial dimensions". A spatial location in a spatial data map refers to a position in the spatial data map indexed by values of the spatial dimension coordinates. Each spatial location in a spatial data map characterizes a respective spatial region of the environment. In some cases, some or all of the spatial data maps 202 processed by the object localization system 200 have the same perspective of the environment and are aligned with one another. That is, corresponding spatial locations in the different spatial data maps characterize the same spatial region in the environment.

In some implementations, the object localization system 200 may be configured to process a roadmap spatial data map which defines known positions of static objects (e.g., traffic lights, crosswalks, and the like) in the environment in the vicinity of the vehicle. In some implementations, the object localization system 200 may be configured to process an elevation spatial data map which defines known elevations (e.g., in feet above sea level) of positions in the environment in the vicinity of the vehicle. In some implementations, the object localization system 200 may be configured to process sensor data from additional vehicle sensors such as heat sensors and audio sensors.

In some implementations, the system 200 generates object localization data 204 which characterizes the location of an object in the vicinity of the vehicle by a numerical value indicating the distance (e.g., measured in feet) of the object from the vehicle. In some implementations, the system 200 generates object localization data 204 which characterizes the location of an object in the vicinity of the vehicle by a set of numerical coordinates indicating the location of the object in a coordinate system that is defined relative to the vehicle. For example, the coordinate system may be a Cartesian coordinate system (e.g., centered on the vehicle), and the object localization data 204 may characterize the location of the object by an (x, y, z) coordinate of the center of the object in the Cartesian coordinate system. As another example, the coordinate system may be a spherical coordinate system (e.g., centered on the vehicle), and the object localization data 204 may characterize the location of the object by an (r, θ, φ) coordinate of the center of the object in the spherical coordinate system.

In the example depicted by 206, the object localization data 204 characterizes the location of a "Stop" sign in the vicinity of the vehicle by the coordinates of the center of the "Stop" sign in a Cartesian coordinate system centered on the vehicle.

For convenience, the description which follows refers to the system 200 generating object localization data 204 which characterizes the location, relative to the vehicle, of a particular object in the vicinity of the vehicle. More generally, the system 200 can generate object localization data 204 which characterizes the location, relative to the vehicle, of any number of objects in the vicinity of the vehicle.

To generate object localization data 204 which characterizes the location of a particular object relative to the vehicle, the system 200 first obtains data defining the position of the particular object in the spatial data maps 202. More specifically, the system 200 obtains data which defines a particular spatial region in the spatial data maps 202 that has been classified as including sensor data that characterizes the particular object. A spatial region in a spatial data map refers to a set of spatial locations in the spatial data map. For example, the data defining the position of the particular object in the spatial data maps 202 may be an object bounding box 208 which is defined by the coordinates of a bounding box delineating a particular spatial region in the spatial data maps 202 that represents the particular object. In the description which follows, while the data defining the position of the particular object in the spatial data maps 202 may be referred to as an object bounding box 208, it should be understood that the data defining the position of the particular object in the spatial data maps 202 can have any other appropriate format. For example, the data defining the position of the particular object in the spatial data maps 202 may define a non-rectangular (e.g., circular) spatial region in the spatial data maps 202. In some implementations, the data defining the position of the particular object in the spatial data maps 202 may be an output generated by an object detection neural network by processing an input including the spatial data maps 202.

While the object bounding box 208 defines the position of the particular object in the spatial data maps 202, to generate the object localization data 204, the system 200 must determine the location of the particular object relative to the vehicle. For example, the system 200 may be configured to translate from data defining a bounding box around the particular object in a set of spatial data maps to 3D localization data characterizing the position of the particular object in 3D space relative to the vehicle. Even when the spatial data maps 202 include sensor data (e.g., from laser or radar sensors) characterizing the distance from the vehicle to points in the vicinity of the vehicle, the object bounding box 208 may not directly define the object localization data 204. For example, a bounding box around the particular object in a spatial data map representing laser or radar sensor data may include data defining distances from the vehicle to points behind the particular object and in front of the particular object, in addition to points on the particular object.

The system 200 processes the spatial data maps 202 using a convolutional neural network 210, in accordance with trained values of convolutional neural network parameters, to generate a sensor feature representation 212. The sensor feature representation 212 can be represented in any appropriate numerical format, for example, as a multi-dimensional matrix (i.e., tensor) of numerical values. In some cases, the sensor feature representation 212 can be represented as a three-dimensional matrix, where two of the dimensions of the matrix are "spatial dimensions". A spatial location in the sensor feature representation 212 refers to a position in the sensor feature representation indexed by values of the spatial dimension coordinates. Each spatial location in the sensor feature representation characterizes a respective spatial region of the spatial data maps. The sensor feature representation 212 can be understood as an alternative representation of the spatial data maps 202 which represents complex data interactions within and between spatial data maps in a form which can be effectively processed to determine the locations of objects in the vicinity of the vehicle. Optionally, the convolutional neural network 210 may additionally process a roadmap spatial data map, an elevation spatial data map, and sensor data generated by additional vehicle sensors (e.g., audio and heat sensors), as described earlier.

The system 200 includes a cropping engine 214 which is configured to generate an object feature representation 216 of the particular object from a portion of the sensor feature representation 212 corresponding to the particular spatial region in the spatial data maps 202 defined by the object bounding box 208. For example, as will be described in more detail with reference to FIG. 4, the cropping engine 214 can generate the object feature representation 216 by cropping the portion of the sensor feature representation 212 corresponding to a bounding box around the particular object in the spatial data maps 202 which is defined by the object bounding box 208. In some implementations, the cropping engine 214 may additionally be configured to generate the object feature representation 216 of the particular object from a portion of the one or more spatial data maps 202 corresponding to the particular spatial region defined by the object bounding box 208.

The system 200 processes the object feature representation 216 using a localization neural network 218, in accordance with current values of localization neural network parameters, to generate the object localization data 204 characterizing the location of the particular object relative to the vehicle. The localization neural network 218 can be implemented using any appropriate neural network architecture. For example, the localization neural network 218 may include one or more convolutional neural network layers followed by one or more fully-connected neural network layers.

In some implementations, the localization neural network 218 is configured to generate numerical output data which directly characterizes the location of the particular object relative to the vehicle. For example, the output layer of the localization neural network 218 may be defined by a single neuron that generates an activation characterizing a distance from the vehicle to the particular object. As another example, the output layer of the localization neural network 218 may be defined by a set of multiple neurons that each correspond to a respective dimension of a coordinate system, and the activations of these neurons may characterize a location of the particular object in the coordinate system.

In some implementations, the localization neural network 218 is configured to generate data defining a probability distribution over a predetermined set of possible locations of the object relative to the vehicle. For example, the output layer of the localization neural network 218 may be a soft-max layer including multiple neurons which each correspond to a respective location in a predetermined lattice of possible locations of the particular object relative to the vehicle. In this example, the activation of each neuron in the output layer may define a respective probability that the particular object is situated at the location corresponding to the neuron. In some of these implementations, the system 200 may generate the object localization data 204 by sampling a possible location of the particular object relative to the vehicle in accordance with the probability distribution. Alternatively, the system 200 may generate the object localization data 204 by selecting a possible location of the particular object relative to the vehicle that has a highest probability value according to the probability distribution generated by the localization neural network 218.

As described above, the object localization data 204 generated by the system 200 can be processed by other components of an on-board system of a vehicle to, for example, make fully-autonomous or partly-autonomous driving decisions.

The trained parameter values of the convolutional neural network 210, the localization neural network 218, or both can be provided to the object localization system 200 by a training system, as will be described further with reference to FIG. 3.

Figure 3:
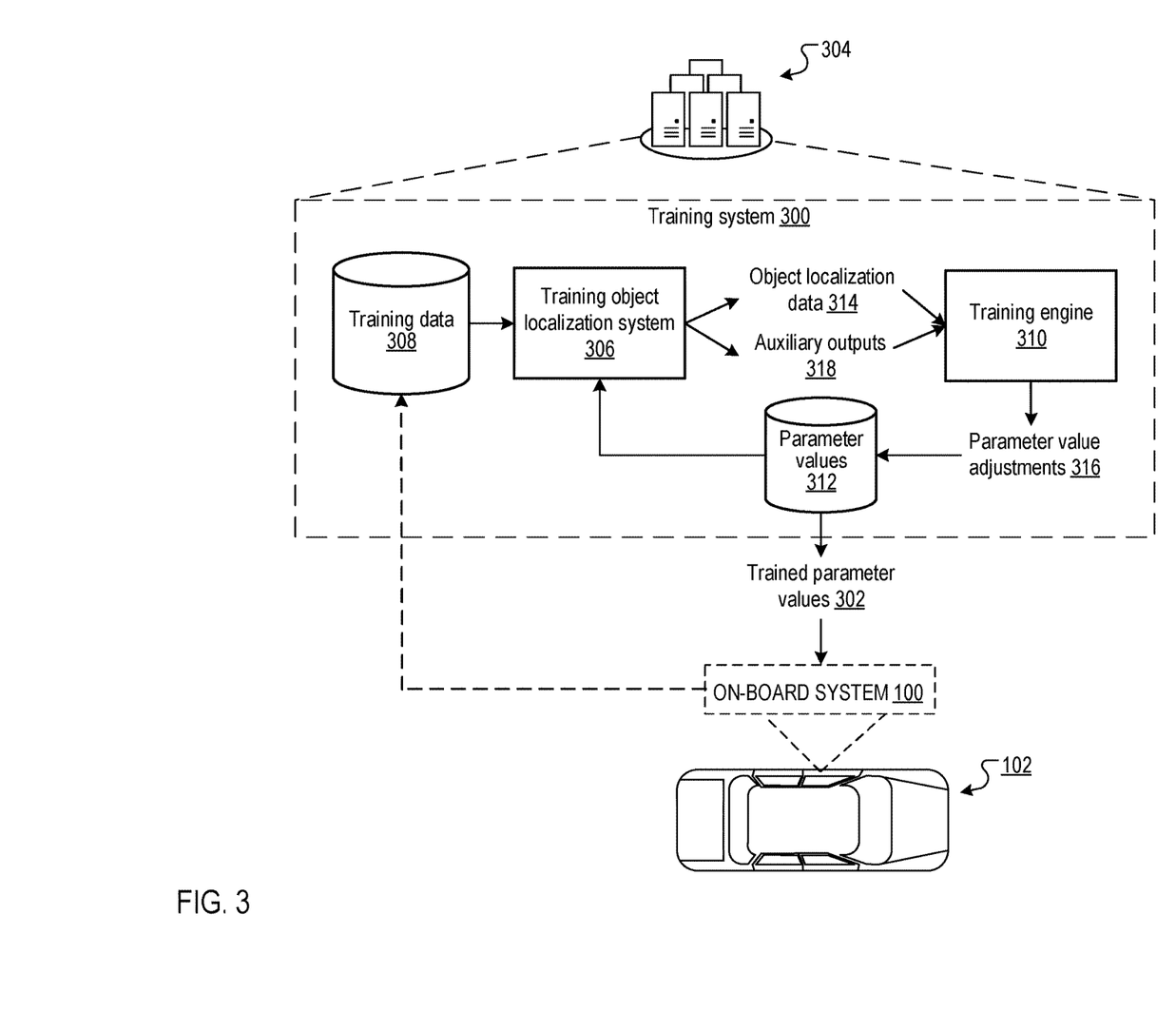
FIG. 3 is a block diagram of an example training system.

FIG. 3 is a block diagram of an example training system 300. The training system 300 is an example of a system implemented as computer programs on one or more computers in one or more locations in which the systems, components, and techniques described below are implemented.

The training system 300 is configured to generate a set of trained parameter values 302 for the parameters of the convolutional neural network, the localization neural network, or both of the object localization system in the on-board system 100 of the vehicle 102. As will be described in more detail below, the training system 300 generates trained parameter values 302 which are optimized to enable the on-board object localization system to generate accurate object localization data. The training system 300 is typically hosted within a data center 304, which can be a distributed computing system having hundreds or thousands of computers in one or more locations. The training system 300 can provide the trained parameter values 302 to the on-board system 100 by a wired or wireless connection.

The training system 300 includes a training object localization system 306 which includes computing devices having software or hardware modules that implement the respective operations of the on-board object localization system (e.g., described with reference to FIG. 2). In particular, the training object localization system 306 implements the operations of a training convolutional neural network and a training localization neural network. The training neural networks generally have the same (or similar) architecture as the on-board neural networks.

The training system 300 trains the training object localization system 306 based on a set of training data 308. The training data 308 includes multiple training examples, where each training example can include: (i) one or more training spatial data maps, (ii) a training object bounding box defining a particular region in the training spatial data maps that has been classified as including sensor data that characterizes a particular training object in the environment in the vicinity of the vehicle, and (iii) target object localization data that characterizes the position of the particular training object in the environment relative to the vehicle. The target object localization data represents the object localization data which should be generated by the training object localization system 306 by processing the training spatial data maps and the training object bounding box included in the training example.

To generate the trained parameter values 302, a training engine 310 iteratively adjusts the parameter values 312 of the training object localization system 306 to cause the training object localization system 306 to generate object localization data outputs 314 which match the target object localization data specified by the training examples. The parameter values 312 of the training object localization system 306 include the parameter values of the training convolutional neural network, the training localization neural network, or both. The training engine 310 iteratively adjusts the parameter values 312 of the training object localization system 306 by using machine learning training techniques (e.g., stochastic gradient descent) to generate iterative parameter value adjustments 316 which are used to adjust the parameter values 312. After determining that a training termination criterion is met, the training system 300 can output trained parameter values 302 corresponding to the current parameter values 312 at the final training iteration.

In some implementations, the training examples included in the training data 308 include additional target auxiliary outputs. For example, as will be described further with reference to FIG. 5, the target auxiliary outputs may characterize a geometry of the environment in the vicinity of the vehicle, attributes of the particular training object, or future attributes of the particular training object. In these implementations, the training object localization system 306 may be configured to generate auxiliary outputs corresponding to some or all of the target auxiliary outputs specified by the training examples. The training engine 310 can additionally adjust the parameter values 312 to cause the training object localization system 306 to generate auxiliary outputs 318 which match the target auxiliary outputs specified by the training examples. By co-training the training object localization system 306 to generate auxiliary outputs 318 in addition to the object localization data 314, the training system 300 can determine the trained parameter values 302 using fewer training iterations.

The training spatial data maps corresponding to the training examples of the training data 308 can be obtained from logged sensor data acquired by vehicle sensors, from simulated sensor data acquired from simulated vehicle sensors in a simulated environment, or both. The training object bounding box, target object localization data, and target auxiliary outputs corresponding to the training examples of the training data 308 can be generated by automated annotation procedures, manual annotation procedures, or a combination of both.

To reduce overfitting during training, the training convolutional neural network and the training localization neural network may include one or more dropout layers. The dropout layers may be configured to randomly drop out (e.g., by setting to a constant value) one or more of the spatial data maps (e.g., the spatial data map generated from the raw sensor data of a laser sensor). In this manner, the object localization system can be trained to generate accurate object localization data even if some sensors are unavailable (e.g., due to being damaged) and to generalize more effectively to new environments.

Figure 4:
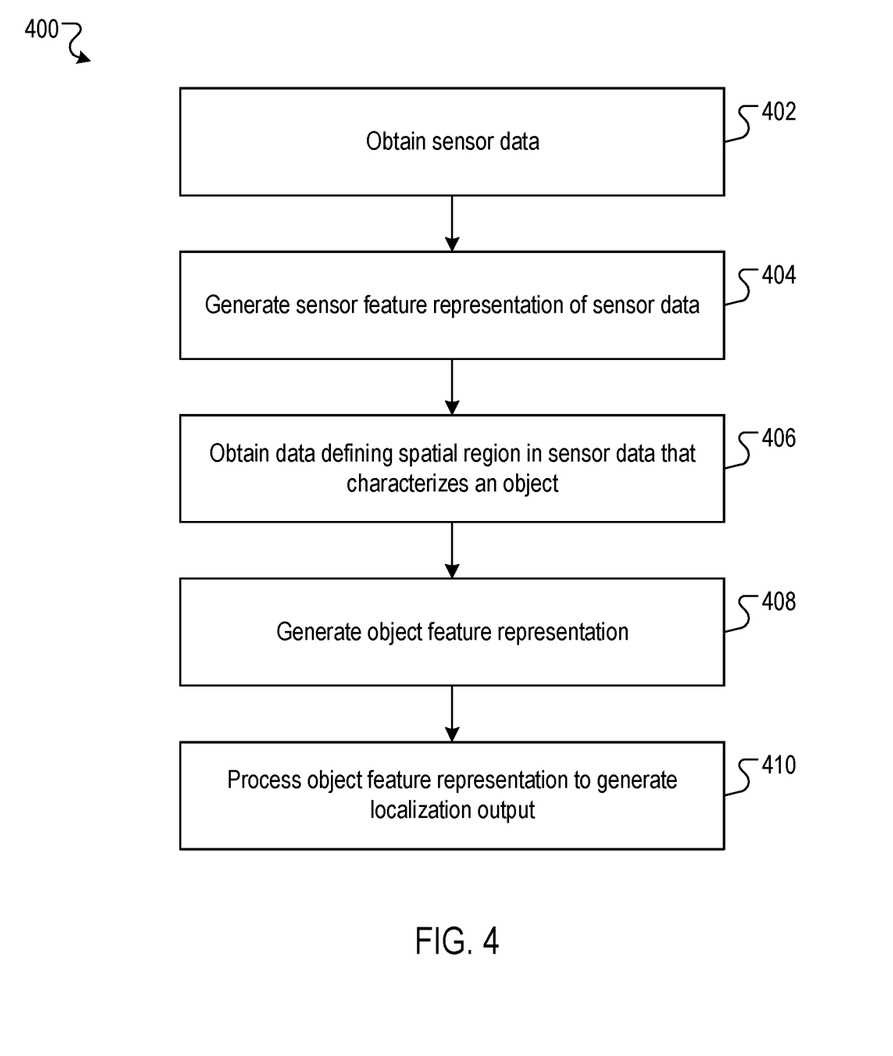
FIG. 4 is a flow diagram of an example process for generating object localization data characterizing the location of a particular object relative to a vehicle.

FIG. 4 is a flow diagram of an example process 400 for generating object localization data characterizing the location of a particular object relative to a vehicle. For convenience, the process 400 will be described as being performed by a system of one or more computers located in one or more locations. For example, an object localization system, e.g., the object localization system 200 of FIG. 2, appropriately programmed in accordance with this specification, can perform the process 400.

The system obtains sensor data captured by sensors of the vehicle (402). The sensor data can represent data captured by laser sensors, radar sensors, camera sensors, or other vehicle sensors. Some or all of the sensor data can be represented by respective spatial data maps, that is, by respective matrices (e.g., two- or three-dimensional matrices) of numerical values (as described with reference to FIG. 2).

The system generates a sensor feature representation by processing the sensor data (in particular, the spatial data representing the sensor data) using a convolutional neural network in accordance with current values of convolutional neural network parameters (404). To process multiple spatial data maps using the convolutional neural network, the system first concatenates the spatial data maps with the same perspective of the environment to align their respective spatial locations. Spatial data maps with different perspectives the environment may be processed by different convolutional neural networks, and the outputs of these different convolutional neural networks may jointly form the sensor feature representation. The sensor feature representation can be represented in any appropriate numerical format, for example, as a multi-dimensional matrix of numerical values.

The system obtains data which defines the position of the particular object in the sensor data (406). More specifically, the system obtains data which defines a particular spatial region in the sensor data (in particular, the spatial data maps) that has been classified as including sensor data that characterizes the particular object. For example, data defining the particular spatial region in the sensor data may be defined by the coordinates of a bounding box delineating a particular spatial region in the spatial data maps that represents the particular object. In some implementations, the data defining the particular spatial region in the sensor data (e.g., the object bounding box) is an output generated by an object detection neural network by processing an input including the spatial data maps.

The system generates an object feature representation of the particular object from a portion of the sensor feature representation corresponding to the particular spatial region in the sensor data that has been classified as including sensor data that characterizes the particular object (408). For example, the system can generate the object feature representation by cropping the portion of the sensor feature representation corresponding to the particular spatial region (e.g., as defined by a bounding box) and using pooling operations to transform the cropped portion of the sensor feature representation to a predetermined size. In this example, the pooling operations may include dividing the cropped portion of the sensor feature representation into a grid of a predetermined number of sub-windows, and then max-pooling the values in each sub-window into a corresponding position in the object feature representation. By using the described pooling operations, the system can generate an object feature representation with a predetermined size suitable for processing by the localization neural network (to be described in 410) regardless of the size of the particular spatial region defined by the object bounding box.

When the sensor feature representation includes the outputs of multiple different convolutional neural networks which each process spatial data maps with a respective perspective of the environment, the system may generate the object feature representation from respective portions of the output of each convolutional neural network. More specifically, the system can generate the object feature representation by cropping and pooling the respective portion of the output of each convolutional neural network corresponding to the particular spatial region in the sensor data that has been classified as including sensor data that characterizes the particular object.

In some cases, the spatial dimensionality of the sensor feature representation may be lower than the spatial dimensionality of the spatial data maps, for example, due to convolution and pooling operations performed in the convolutional neural network used to generate the sensor feature representation. In a particular example, the spatial dimensionality of the spatial data maps may be 300×300, while the spatial dimensionality of the sensor feature representation may be 250×250. In these cases, the portion of the sensor feature representation corresponding to the particular spatial region in the spatial data maps (e.g., defined an object bounding box) may be adjusted to account for the reduction in spatial dimensionality of the sensor feature representation relative to the spatial data maps. For example, the coordinates of a bounding box in the spatial data maps defined by the object bounding box may be translated, rescaled, or both to account for the reduction in spatial dimensionality of the sensor feature representation relative to the spatial data maps.

Optionally, the system may additionally generate the object feature representation of the particular object based on the portion sensor data that has been classified as including sensor data that characterizes the particular object. For example, the system may crop the portion of the spatial data maps corresponding to the particular spatial region, transform the cropped portion of the spatial data maps to a predetermined size (e.g., using pooling operations, as described above), and concatenate the resulting data to the object feature representation.

The system generates the object localization data characterizing the location of the particular object relative to the vehicle by processing the object feature representation using a localization neural network in accordance with current values of localization neural network parameters (410).

In some implementations, the localization neural network is configured to generate numerical output data which directly characterizes the location of the object relative to the vehicle. For example, the localization neural network may be configured to generate numerical data defining numerical coordinates of the center of the object relative to the vehicle in a coordinate system (e.g., a Cartesian coordinate system) defined relative to the vehicle.

In some implementations, the localization neural network is configured to generate data defining a probability distribution over a predetermined set of possible locations of the object relative to the vehicle. For example, the localization neural network may be configured to generate numerical data which includes a respective probability value for each location in a predetermined lattice of possible locations of the object relative to the vehicle. In some of these implementations, the system may generate the object localization data characterizing the location of the particular object relative to the vehicle by sampling a possible location of the particular object relative to the vehicle in accordance with the probability distribution. Alternatively, the system may generate the object localization data characterizing the location of the particular object relative to the vehicle by selecting a possible location of the particular object relative to the vehicle that has a highest probability value according to the probability distribution generated by the localization neural network.

Figure 5:
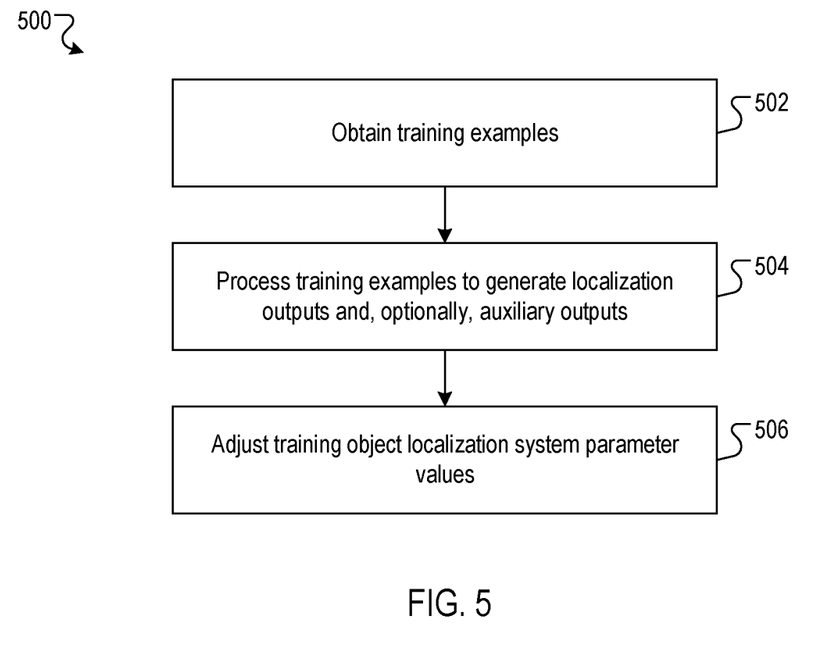
FIG. 5 is a flow diagram of an example process for updating the parameter values of a training object localization system.

FIG. 5 is a flow diagram of an example process 500 for updating the parameter values of a training object localization system. In particular, FIG. 5 describes one iteration of an example iterative process for updating the parameter values of a training object localization system. For convenience, the process 500 will be described as being performed by a training system including one or more computers located in one or more locations. For example, the training system 300 of FIG. 3, appropriately programmed in accordance with this specification, can perform the process 500.

The training system obtains one or more training examples (502). Each training example includes: (i) one or more training spatial data maps, (ii) a training object bounding box defining a particular region in the training spatial data maps that has been classified as including sensor data that characterizes a particular training object in the vicinity of the vehicle, and (iii) target object localization data that characterizes the position of the particular training object relative to the vehicle. Optionally, as will be described in more detail below, each training example can include additional target auxiliary outputs in addition to the target object localization data. More generally, each training example can include any appropriate data defining the particular region in the training spatial data maps that has been classified as including sensor data that characterizes a particular training object in the vicinity of the vehicle, and this data is not limited to being represented by a bounding box.

In some implementations, each training example includes target auxiliary outputs characterizing a geometry of the environment in the vicinity of the vehicle. For example, the target auxiliary outputs characterizing the geometry of the environment may include a target per-pixel depth map, that is, data defining a depth value corresponding to each pixel of the training spatial data maps. As another example, the target auxiliary outputs characterizing the geometry of the environment may include data defining spatial regions in the training spatial data maps that have been classified as including sensor data that characterizes objects in the environment in the vicinity of the vehicle. In this example, the target auxiliary outputs characterizing the geometry of the environment may include data defining bounding boxes in the training spatial data maps which enclose sensor data characterizing objects in the environment in the vicinity of the vehicle. As another example, the target auxiliary outputs characterizing the geometry of the environment may include data defining a spatial region in the training spatial data maps which has been classified as including sensor data that characterizes an area of ground beneath the particular training object. In this example, the target auxiliary outputs characterizing the geometry of the environment may include data defining a bounding box in the training spatial data maps which encloses sensor data characterizing an area of ground beneath the particular training object.

In some implementations, each training example includes target auxiliary outputs characterizing attributes of the particular training object. For example, the target auxiliary outputs characterizing attributes of the particular training object may include data defining the size of the particular training object (e.g., measured in square feet). As another example, the target auxiliary outputs characterizing attributes of the particular training object may include data defining the type of the particular training object (e.g., "vehicle", "pedestrian", "obstacle", and the like).

In some implementations, each training example includes target auxiliary outputs characterizing future attributes of the particular training object. For example, the target auxiliary outputs characterizing the future attributes of the particular training object may include data defining a future location of the center of the particular training object in a particular coordinate system after a predetermined amount of time has elapsed (e.g. 1 second). As another example, the target auxiliary outputs characterizing the future attributes of the particular training object may include data defining a future appearance (e.g., visual appearance) of the particular training object after a predetermined amount of time has elapsed.

The training system may obtain one or more training examples by randomly sampling training examples from a set of training data which includes multiple training examples. For convenience, the process 500 will be described with reference to a particular training example.

The training system processes the training spatial data maps and the training object bounding box included in the particular training example using the training object localization system to generate object localization data characterizing the location of the particular training object relative to the vehicle (504). Optionally, the training object localization system (in particular, the training convolutional neural network, the training localization neural network, or both) may be configured to generate additional auxiliary outputs corresponding to some or all of the target auxiliary outputs included in the training example. That is, the training convolutional neural network, the training localization neural network, or both may include one or more additional layers (i.e., layers additional to those which are used to generate the object localization data) which are configured to generate the additional auxiliary outputs. To generate the additional auxiliary outputs, the one or more additional layers process outputs from one or more intermediate (i.e., hidden) layers of the training convolutional neural network or training localization neural network.

The training object localization system (e.g., the convolutional neural network, the localization neural network, or both) may be configured to generate auxiliary outputs characterizing the geometry of the environment in the vicinity of the vehicle, attributes of the particular training object, or future attributes of the particular training object. When the training object localization system is configured to generate auxiliary outputs characterizing future attributes of the particular training object, the training object localization system (and the object localization system in the on-board system of the vehicle) may be configured to process spatial data maps from multiple time points.

The training system adjusts the current parameter values of the training object localization system (i.e., the current parameter values of the training convolutional neural network, the training localization neural network, or both) based on the object localization output data and (optionally) the auxiliary outputs (506). For example, the training system may determine an update to the current parameter values of the training object localization system by computing a gradient of a loss function with respect to the current parameter values of the training object localization system. The loss function may include a respective term for the object localization output and for each auxiliary output generated by the training object localization system. For example, the loss function may include a mean-squared error term measuring a difference between the object localization output generated by the training object localization system and the target object localization output specified by the particular training example. As another example, the loss function may include a cross-entropy loss term between an auxiliary output generated by the training object localization system which characterizes the type of the particular training object and a corresponding target auxiliary output specified by the training example.

After computing the gradient of the loss function with respect to the current parameter values of the training object localization system, the training system adjusts the current values of the object localization system parameters using any appropriate gradient descent optimization algorithm update rule. Examples of gradient descent optimization algorithms include Adam, RMSprop, Adagrad, Adadelta, and AdaMax, amongst others. When the training object localization system is configured to generate auxiliary outputs, the training system can adjust the current values of some or all of the training object localization system parameters using the gradients of the loss function terms corresponding to the auxiliary outputs.

This specification uses the term "configured" in connection with systems and computer program components. For a system of one or more computers to be configured to perform particular operations or actions means that the system has installed software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus, the method comprising:
    obtaining sensor data captured by one or more sensors of a vehicle;
    processing an input comprising the sensor data using a convolutional neural network to generate an output comprising a sensor feature representation of the sensor data;
    obtaining data defining a particular spatial region in the sensor data that has been classified as including sensor data that characterizes a particular object in an environment in a vicinity of the vehicle;
    cropping, from the sensor feature representation generated as the output of the convolutional neural network, a portion of the sensor feature representation corresponding to the particular spatial region;
    generating an object feature representation of the particular object from the cropped portion of the sensor feature representation corresponding to the particular spatial region; and
    processing an input comprising the object feature representation of the particular object using a localization neural network to generate an output characterizing a distance of the particular object in the environment from the vehicle.

2. The method of claim 1, wherein obtaining sensor data captured by one or more sensors of the vehicle comprises:
    aligning and combining sensor data captured by one or more of: a laser sensor of the vehicle, a radar sensor of the vehicle, and a camera sensor of the vehicle.

3. The method of claim 1, wherein obtaining data defining a particular spatial region in the sensor data that has been classified as including sensor data that characterizes a particular object in the environment in the vicinity of the vehicle comprises:
    obtaining an object bounding box with a rectangular geometry.

4. The method of claim 1, wherein obtaining data defining a particular spatial region in the sensor data that has been classified as including sensor data that characterizes a particular object in an environment in a vicinity of the vehicle comprises:
    obtaining data generated by processing at least part of the sensor data using an object detection neural network to generate data defining the particular spatial region.

5. The method of claim 1, further comprising:
    generating the object feature representation of the particular object from a portion of the sensor data corresponding to the particular spatial region in addition to the cropped portion of the sensor feature representation corresponding to the particular spatial region.

6. The method of claim 1, wherein generating the object feature representation of the particular object from the cropped portion of the sensor feature representation corresponding to the particular spatial region comprises:
transforming the cropped portion of the sensor feature representation to a fixed size using one or more pooling operations.

7. The method of claim 1, wherein processing the input comprising the object feature representation of the particular object using the localization neural network to generate the output characterizing the distance of the particular object in the environment from the vehicle comprises:
processing the input comprising the object feature representation using the localization neural network to generate an output comprising coordinates characterizing a position of a center of the particular object in the environment, wherein the coordinates are expressed in a coordinate system which is defined relative to the vehicle.

8. A system, comprising:
a data processing apparatus;
a memory in data communication with the data processing apparatus and storing instructions that cause the data processing apparatus to perform operations comprising:
obtaining sensor data captured by one or more sensors of a vehicle;
processing an input comprising the sensor data using a convolutional neural network to generate an output comprising a sensor feature representation of the sensor data;
obtaining data defining a particular spatial region in the sensor data that has been classified as including sensor data that characterizes a particular object in an environment in a vicinity of the vehicle;
cropping, from the sensor feature representation generated as the output of the convolutional neural network, a portion of the sensor feature representation corresponding to the particular spatial region;
generating an object feature representation of the particular object from the cropped portion of the sensor feature representation corresponding to the particular spatial region; and
processing an input comprising the object feature representation of the particular object using a localization neural network to generate an output characterizing a distance of the particular object in the environment from the vehicle.

9. The system of claim 8, wherein obtaining sensor data captured by one or more sensors of the vehicle comprises:
aligning and combining sensor data captured by one or more of: a laser sensor of the vehicle, a radar sensor of the vehicle, and a camera sensor of the vehicle.

10. The system of claim 8, wherein obtaining data defining a particular spatial region in the sensor data that has been classified as including sensor data that characterizes a particular object in the environment in the vicinity of the vehicle comprises:
obtaining an object bounding box with a rectangular geometry.

11. The system of claim 8, wherein obtaining data defining a particular spatial region in the sensor data that has been classified as including sensor data that characterizes a particular object in an environment in a vicinity of the vehicle comprises:
obtaining data generated by processing at least part of the sensor data using an object detection neural network to generate data defining the particular spatial region.

12. The system of claim 8, wherein the operations further comprise:
generating the object feature representation of the particular object from a portion of the sensor data corresponding to the particular spatial region in addition to the cropped portion of the sensor feature representation corresponding to the particular spatial region.

13. One or more non-transitory computer storage media storing instructions that when executed by one or more computers cause the one or more computers to perform operations comprising:
obtaining sensor data captured by one or more sensors of a vehicle;
processing an input comprising the sensor data using a convolutional neural network to generate an output comprising a sensor feature representation of the sensor data;
obtaining data defining a particular spatial region in the sensor data that has been classified as including sensor data that characterizes a particular object in an environment in a vicinity of the vehicle;
cropping, from the sensor feature representation generated as the output of the convolutional neural network, a portion of the sensor feature representation corresponding to the particular spatial region;
generating an object feature representation of the particular object from the cropped portion of the sensor feature representation corresponding to the particular spatial region; and
processing an input comprising the object feature representation of the particular object using a localization neural network to generate an output characterizing a distance of the particular object in the environment from the vehicle.

14. The one or more non-transitory computer storage media of claim 13, wherein obtaining sensor data captured by one or more sensors of the vehicle comprises:
aligning and combining sensor data captured by one or more of: a laser sensor of the vehicle, a radar sensor of the vehicle, and a camera sensor of the vehicle.

15. The one or more non-transitory computer storage media of claim 13, wherein obtaining data defining a particular spatial region in the sensor data that has been classified as including sensor data that characterizes a particular object in the environment in the vicinity of the vehicle comprises:
obtaining an object bounding box with a rectangular geometry.

16. The one or more non-transitory computer storage media of claim 13, wherein obtaining data defining a particular spatial region in the sensor data that has been classified as including sensor data that characterizes a particular object in an environment in a vicinity of the vehicle comprises:
obtaining data generated by processing at least part of the sensor data using an object detection neural network to generate data defining the particular spatial region.

17. The one or more non-transitory computer storage media of claim 13, wherein the operations further comprise:
generating the object feature representation of the particular object from a portion of the sensor data corresponding to the particular spatial region in addition to the cropped portion of the sensor feature representation corresponding to the particular spatial region.

18. The one or more non-transitory computer storage media of claim 13, wherein generating the object feature representation of the particular object from the cropped portion of the sensor feature representation corresponding to the particular spatial region comprises:

transforming the cropped portion of the sensor feature representation to a fixed size using one or more pooling operations.

19. The one or more non-transitory computer storage media of claim 13, wherein processing the input comprising the object feature representation of the particular object using the localization neural network to generate the output characterizing the distance of the particular object in the environment from the vehicle comprises:

processing the input comprising the object feature representation using the localization neural network to generate an output comprising coordinates characterizing a position of a center of the particular object in the environment, wherein the coordinates are expressed in a coordinate system which is defined relative to the vehicle.

* * * * *